(12) United States Patent
Gould et al.

(10) Patent No.: US 6,543,373 B1
(45) Date of Patent: Apr. 8, 2003

(54) METHODS OF PLANTING SUGARCANE SEED TO ACHIEVE A HIGH PLANT DENSITY

(75) Inventors: J. Michael Gould, Wellington, FL (US); Michael S. Irey, Clewiston, FL (US); John F. Larsen, Clewiston, FL (US); Stuart E. McGahee, Clewiston, FL (US)

(73) Assignee: United States Sugar Corporation, Clewiston, FL (US)

( * ) Notice: Subject to any disclaimer, the term of this patent is extended or adjusted under 35 U.S.C. 154(b) by 0 days.

(21) Appl. No.: 09/653,503

(22) Filed: Sep. 1, 2000

(51) Int. Cl.[7] .............................................. A01C 11/00
(52) U.S. Cl. ........................ 111/109; 111/900; 111/907
(58) Field of Search ................................. 111/907, 100, 111/109, 111, 200, 900

(56) References Cited

U.S. PATENT DOCUMENTS

| | | | | |
|---|---|---|---|---|
| 3,279,400 A | * | 10/1966 | Gonzalez | |
| 3,468,441 A | * | 9/1969 | Longman | |
| 3,702,664 A | * | 11/1972 | Clement | |
| 3,890,909 A | * | 6/1975 | Boots | |
| 3,963,138 A | * | 6/1976 | Fowler | |
| 4,106,669 A | * | 8/1978 | Longman | |
| 4,450,778 A | * | 5/1984 | Quick | |
| 5,357,882 A | * | 10/1994 | Lemmons | |
| 5,469,797 A | * | 11/1995 | Hearne, Jr. | |

FOREIGN PATENT DOCUMENTS

| | | | | |
|---|---|---|---|---|
| AU | 87770 | * | 11/1928 | ................. 111/907 |
| AU | 474266 | * | 2/1974 | ................. 111/907 |

OTHER PUBLICATIONS

Norris, C.P., et al., "High Density Planting as an Economic–Production Strategy: (c) A Farming System and Equipment Requirements", Aust. Soc. Sugar Cane Technol., vol. 22, 2000, 113–18.

Nasuriwong, P., "Sugar Cane Response to Plant Density Using a Fan Design", Abstract of a Masters Degree thesis presented to the Multiple Cropping Center at the Chiang Mai University. Available at the following internet link: http://www.aggie.cmu.ac.th/graduate/thesis/prod44.html.

Humbert, R., "Planting of Sugar Cane", *The Growing of Sugar Cane*, Elsevier Publishing Company, 1968, 103–27.

Matherne, R.J., "Influence of Inter–Row Spacing and Planting Rate on a Stalk Population and Cane Yield in Louisiana", Proceedings of the International Society of Sugar Cane Technologists, 1971, 610–45.

Matherne, R.J., "Effects of Inter–Row Spacing on Sugar Cane Yields in Louisiana", International Society of Sugar Cane Technologists, vol. 2, 1974, 746–50.

(List continued on next page.)

*Primary Examiner*—Victor Batson
(74) *Attorney, Agent, or Firm*—Cummings & Lockwood

(57) ABSTRACT

Methods for planting sugarcane seed are provided to achieve high sugarcane plant densities per unit area. The methods include providing sugarcane seed pieces in an appropriate length, preparing the soil for planting the sugarcane seed by creating rows of wide furrows or wide seedbeds, placing the sugarcane seed on the prepared soil in a random orientation to form a layer of sugarcane seed or in an orientation perpendicular to the direction of the furrows or seedbeds, and covering the sugarcane pieces with soil. Soil preparation includes creation of wide rows of furrows, flat seedbeds or raised seedbeds, with each row ranging in width from about 0.5 meters to about 3.1 meters.

4 Claims, 3 Drawing Sheets

OTHER PUBLICATIONS

Ridge, D.R., et al., "A Review of Row Spacing Research in the Australian Sugar Industry", Proceedings of the International Society of Sugar Cane Technologists, 1994, 63–69.

Carter, C.E., et al., "Yield Response of Sugar Cane to Stalk Density and Subsurface Drainage Treatments", Transactions of the ASAE, vol. 28, No. 1, 1985, 172–78.

Matherne, R.J., et al., "The Influence of Row Spacing on Sugar Cane Stalk Population, Sugar Content and Cane Yield", Proceedings of the American Society of Sugar Cane Technologists, vol. 7, 1978, 96–100.

Irvine, J.E., et al., "Sugar Cane Spacing I. Historical and Theoretical Aspect", Proc. Int. Soc. Sugar Cane Technol. 17:350–55.

Irvine, J.E., et al., "Sugar Cane Spacing II. Effects of Spacing on the Plant", Proc. Int. Soc. Sugar Cane Technol. 17:357–75.

Irvine, J.E., et al., "Sugarcane Spacing III. Development of Production Techniques for Narrow Rows." Proc. Int. Soc. Sugar Cane Technol. 17:368–75.

Bull, T.A., et al., "High Density Planting as an Economic Production Strategy: (b) Theory and Trial Results", Proc. Aust. Soc. Sugar Cane Technol., vol. 22, 2000, 104–12.

Thompson, G.D., et al. , "The Effects of Row Spacing on Sugar Cane Crops in Natal", International Society of Sugar Cane Technologists, Twelfth Congress, 1965, 103–12.

Panje, R., "High Seed Propagation Ratios by the Use of Low Seed Rates in Sugar Cane", International Society of Sugar Cane Technologists, Fifteenth Congress, 1974, 743–45.

Webster, J.N.P., "Widths of Cane Rows in Various Sugar Cane Countries", The Hawaiian Planter's Record, vol. 35, 1931, 217–31.

Hilton, H., "An Analysis of the Influence of Row Spacing and Seed Spacing on Sugar Yields in Hawaiian Sugar Cane", Hawaiian Planters' Record, vol. 59, No. 12, 1982, 265–72.

Shih, S.F., et al., "Sugarcane Stalk Distribution in Two Row Spacings", International Society of Sugar Cane Technologists, Seventeenth Congress, vol. 1, 1980, 38–51.

Tang, "Effects of Inter–Row Spacing on Yields of Sugar Cane in Taiwan", International Society of Sugar Cane Technologists, Sixteenth Congress, vol. 2, 1977, 855–59.

Kanwar, R.S., et al., "Effect of Inter–Row Spacing on Tiller Mortality, Stalk Population and Yield of Sugar Cane", International Society of Sugar Cane Technologists, vol. 2, 1974, 751–55.

Rice, E.R., "Effect of Row Width on Yields of Three Sugar Cane Varieties in Florida", Proceedings American Society of Sugar Cane Technologists, vol. 7, 1978, 122–24.

Rice, E.R., "Effect of Planting Rates on Yields of Sugarcane in Florida", Proceedings American Society of Sugar Cane Technologists, 8 (NS): 53–56.

Gamal, Abd El–Fattah, et al., "Cane Productivity as Effected by Inter–Row Spacing and Cane Cultivars", International Society of Sugar Cane Technologists, vol. 1, 1986, 1–8.

Gascho, G.J. et al. "Row Spacing Effects on Biomass and Composition of Sugarcane in Florida", Proc. Amer. Soc. Sugar Cane Technol., 8(NS): 72–76.

Bull, T.A., et al., "High Density Planting as an Economic Production Strategy: (d) Economic Assessment and Industry Implications", Proc. Aust. Soc. Sugar Cane Technol., vol. 22, 2000, 119–25.

Irvine, J.E., et al., "The Effect of Row Spacing and Sub–Surface Drainage on Sugar Cane Yields", Sugar Cane, No. 2, 1984, 3–5.

Bull, T.A., "Row Spacing and Potential Productivity in Sugar Cane", Agronomy Journal, vol. 67, 1975, 422–23.

Bull, T.A., et al., "High Density Planting as an Economic Production Strategy: (a) Overview and Potential Benefits", Proc. Aust. Soc. Sugar Cane Technol., vol. 22, 2000, 9–15.

BSES Fact Sheet FS98043.

"Dual Row Planting Takes Off in Queensland", Australian Cane Grower.

* cited by examiner

METHODS OF PLANTING SUGARCANE SEED TO ACHIEVE A HIGH PLANT DENSITY

FIELD OF THE INVENTION

The present invention relates to methods of planting sugarcane seed to achieve a high density of sugarcane plants per unit area.

BACKGROUND OF THE INVENTION

Sugarcane belongs to the family of tufted grasses. Sugarcane is propagated by planting whole sugarcane stalks or cuttings of the sugarcane stalk including one or more buds. These cuttings are sometimes referred to as seed pieces or billets. Commercial sugarcane planting involves the planting, either by hand or mechanically, of whole sugarcane stalks or seed pieces. Sugarcane is planted in regularly spaced rows of "V" or "U" shaped furrows, in raised seedbeds, or on flat ground. Raised seedbeds are typically used in swampy, wet areas to keep the sugarcane seed above the level of the water table, while furrows are typically used in drier areas where irrigation may be necessary.

A typical sugarcane field planted using prior methods is illustrated in FIG. 1. In most highly mechanized farms, row spacing (20) is typically in the range of 1.4 to 2.0 meters (4.6 to 6.6 feet) between rows (21). For example, in Florida, the current commercial practice is hand planting of whole stalks in furrows spaced on approximately 1.5 meter (5 foot) centers. Once laid in the furrow, the stalks may be left whole or they may be subsequently chopped into stalk pieces of varying length. In other sugarcane growing regions, the commercial practice is to plant rows of sugarcane seed pieces with a row spacing ranging from 0.5 meters to 2.0 meters (1.6 feet to 6.6 feet) either in furrows, on flat ground or on raised beds. In each case, the distance between rows is required to permit mechanization of the sugarcane planting, cultivation and harvesting operations by providing space for equipment or laborers to travel through the sugarcane field.

Where furrows are used in the rows, the widths of the furrows are typically up to about 0.45 meters (1.5 feet) and the depths of the furrows can vary from about 2.5 centimeters to about 45 centimeters (1 inch to 18 inches) depending upon soil conditions. Where raised seedbeds are used, the height of the raised bed is typically between about 2.5 centimeters to about 45 centimeters (1 inch to 18 inches) depending upon soil conditions. Seeding rates vary depending upon the soil and climate conditions. Typically, seed pieces are placed in the furrow or in the seedbed at seed rates of between approximately 2–13.6 metric tons/hectacre with a single line or multiple lines of sugarcane seed in the furrow. Seed rates may be higher when mechanical planting equipment is used to compensate for seed damage caused by the equipment. As shown in FIG. 2, the orientation of the seed pieces (22) in the, furrow (23) has heretofore been intended to be primarily parallel to the direction of the furrow. Thus, the prior practice has been to intentionally orient the seed pieces in a direction parallel to the direction of the furrow.

In established natural stands of wild sugarcane, stalks of sugarcane may grow as close as 2 to 5 centimeters (0.75 to 2 inches) apart. In commercial plantings, however, the spacing between rows of sugarcane results in fewer plants per unit of field area, which results in less ground cover and less absorption of available light, water and nutrients during early growth stages. It has been reported that sugarcane crops grown at 1.5 meter (5.0 foot) row spacing intercept less than 60% of the available solar radiation. (Muchow et al. 1994, Radiation interception and biomass accumulation in a sugarcane crop grown under irrigated tropical conditions; Aust. J. Agric. Res. 45:37–49). Accordingly, the yield of sugarcane per unit area is reduced as a result of the spacing of rows in commercial planting. There is a large body of data indicating that decreased row spacing increases sugarcane yield. While decreased row spacing can increase sugarcane yield, narrow row spacing can be more difficult to manage and requires expensive modification of equipment.

One approach to addressing the disadvantages of traditional commercial sugarcane planting while increasing the yield of sugarcane per unit area is the use of High Density Planting (HDP). Increased planting density can significantly improve the yield per unit area from a sugarcane crop. HDP generates a more rapid ground cover than the traditional crop grown with a 1.5 meter (5.0 foot) row spacing, thereby increasing solar radiation interception and absorption of water and nutrients. In various studies, increased plant density has translated into increased numbers of sugarcane stalks per unit area, and increased stalk number is directly correlated to increased yield.

Several HDP methods have been investigated to increase sugarcane stalk density per unit area. Attempts to increase stalk population by increasing the amount of seed planted in the traditional furrow have been variable and largely unsuccessful. The use of dual rows planted close enough together so as to be able to use conventional harvest equipment has also been tested, but yield increases using this system have been variable and non-significant in many cases. As a result, the dual row planting system has not been widely adopted. (Bull et al. 2000, High density planting as an economic production strategy: (a) Overview and potential benefits; Proc. Aust. Soc. of Sugar Cane Tech. 22:9–15). In all of these methods, however, the seed pieces are placed in the furrows or seedbeds in the traditional manner, that is oriented in the direction parallel to the direction of the furrow or seedbed.

Another HDP planting method previously investigated involves the use of closely spaced rows. (Bull et al. 2000, High density planting as an economic production strategy: (b) Theory and trial results; Proc. Aust. Soc. of Sugar Cane Tech. 22:104–112). As shown in FIG. 3, the closely spaced rows (32), as proposed in the prior art, are grouped in clusters of three or four furrows (34). The space between rows (30) is typically 0.5 meters (1.6 feet). The distance between the centers of each group of rows (31) is typically 2.1 meters (6.7 feet). The spacing between groups of rows is established sufficiently wide to permit driving machinery between the groups of rows. As shown in FIG. 4, in these prior art close row HDP systems, the seed pieces (33) are planted in each furrow (34) in the traditional manner with an orientation primarily parallel to the direction of the furrow.

Although the close row HDP systems can increase sugarcane yield per unit area, the close row HDP systems used to date have several drawbacks and disadvantages. Close row HDP planting relies on precision equipment and accurate seed placement to plant three or, more typically, four rows 0.5 meters apart. The close spacing of the furrows makes it difficult to prepare the furrows, as disturbed soil from one furrow can fall into the adjacent furrow. Accurate formation of the furrows is considered essential to proper germination of the sugarcane seed. The closeness of the rows makes it necessary to use specialized equipment to minimize the disturbance of the soil. Accurate placement of seed pieces is also considered essential to maintain the optimal plant population. In addition to requiring high levels of precision to form the furrows and plant the four row beds, the planters used to date for the close row HDP system are slow and labor intensive, requiring several people to feed whole stalks to the planter.

Accordingly, it is an object of the present invention to overcome one or more of the drawbacks or disadvantages of the prior art and provide methods for planting sugarcane that can achieve high densities of sugarcane plants per unit area without the need for precision soil preparation or intensive labor.

SUMMARY OF THE INVENTION

The present invention provides methods for planting sugarcane seed that can achieve high densities of sugarcane plants per unit area without the need for precision soil preparation or intensive labor. The method comprises providing sugarcane seed pieces in appropriate lengths, preparing the soil to receive the sugarcane seed pieces, placing the sugarcane seed pieces onto the prepared soil in either a random orientation to form a layer of seed pieces or in a direction perpendicular to the direction of the furrow or seedbed, and covering the sugarcane seed pieces with soil. Soil preparation is achieved either by creating rows of wide furrows or by preparing similarly wide rows of raised or flat seedbeds. The seed pieces may be placed randomly in the furrows or seedbeds, with no effort made to orient the seed pieces in a particular direction. Alternatively, the seed pieces may be oriented primarily perpendicularly to the direction of the furrows or seedbeds. In either case, the planting is performed in a manner that will result in a grid of closely spaced sugarcane plants in the furrow or seedbed. A sufficient quantity of seed pieces are placed in the furrow or in the seedbed to achieve the desired plant density.

Among the advantages of the methods of the present invention is that soil preparation does not require specialized, precision equipment. Because a single wide row is used, accuracy is not required in the formation of the furrow or seedbed. Accordingly, the time and expense involved in preparing the soil is reduced.

A further advantage of the methods of the present invention is that a high density of sugarcane stalks per unit area can be achieved, thereby increasing the yield of sugarcane per unit area.

BRIEF DESCRIPTION OF THE DRAWINGS

So that those having ordinary skill in the art to which the subject invention appertains will more readily understand how to perform the process of the subject invention, reference may be had to the drawings wherein.

DETAILED DESCRIPTION OF THE PREFERRED EMBODIMENTS

The present invention is directed to novel methods for planting sugarcane seed to achieve high densities of sugarcane plants. The methods preferably comprise providing sugarcane seed pieces in an appropriate length; preparing rows of wide furrows with furrow width between about 0.5 meters and about 3.1 meters (about 1.6 feet to 10 feet), preferably between about 0.75 meters and about 3.1 meters (about 2.5 feet to 10 feet), and most preferably between about 1 meters and about 2.5 meters (about 3.3 feet to 8.3 feet); placing the sugarcane seed pieces in the wide furrows in a random fashion with no effort being made to orient the seed pieces in any particular direction; and covering the seed pieces with soil.

The seed pieces used can be of any convenient length, but the length of the longest seed pieces generally should not exceed the width of the furrow. The seed pieces can be cut and prepared as desired using any appropriate method known to those skilled in the art.

Figure 1:
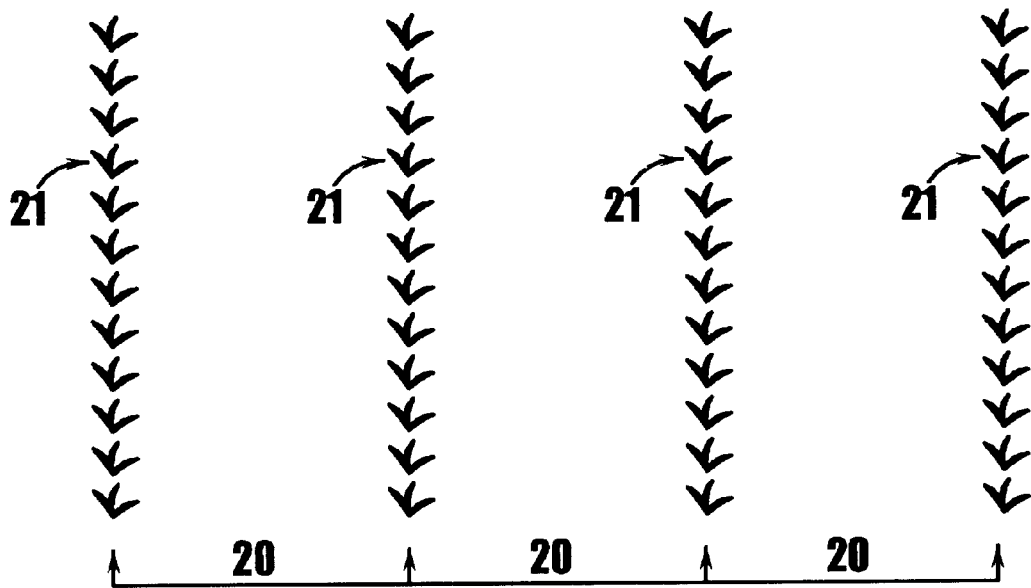
FIG. 1 is a schematic view of a section of a sugarcane field planted using the prior single row planting method.
Figure 2:
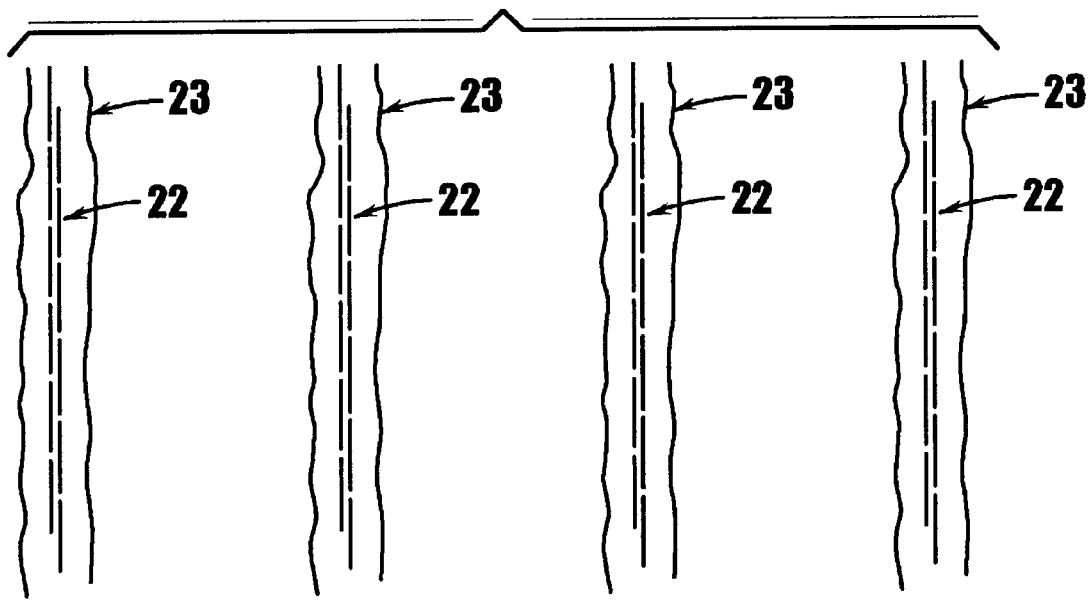
FIG. 2 is a schematic view of a section of the sugarcane seedbeds for the sugarcane field shown in FIG. 1 showing the sugarcane seed pieces planted in an orientation parallel to the direction of the seedbeds.
Figure 3:
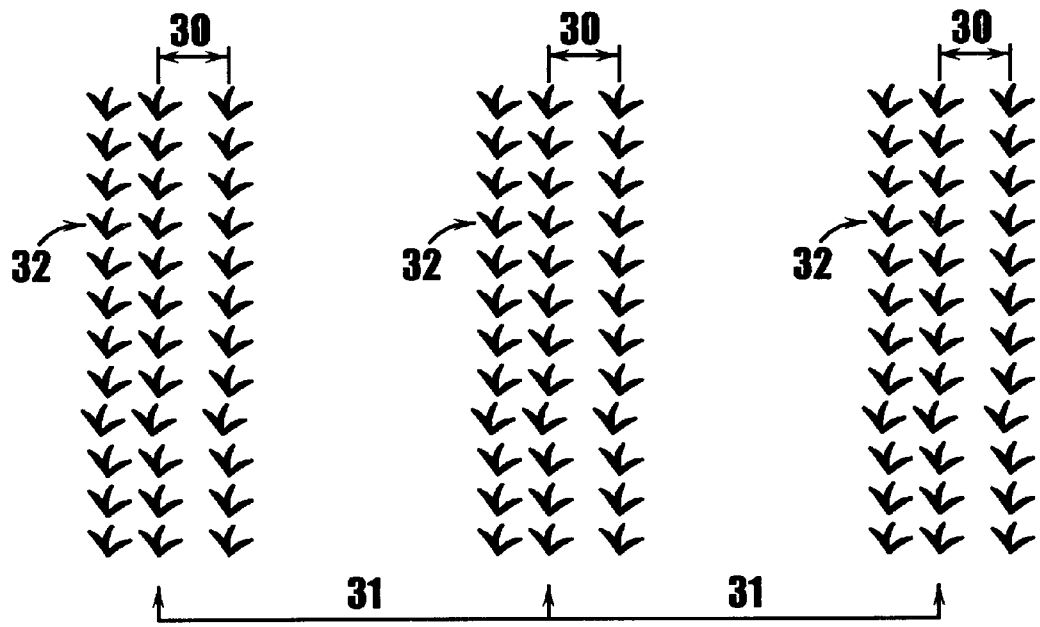
FIG. 3 is a schematic view of a section of a sugarcane field planted using the prior close row High Density Planting Method.
Figure 4:
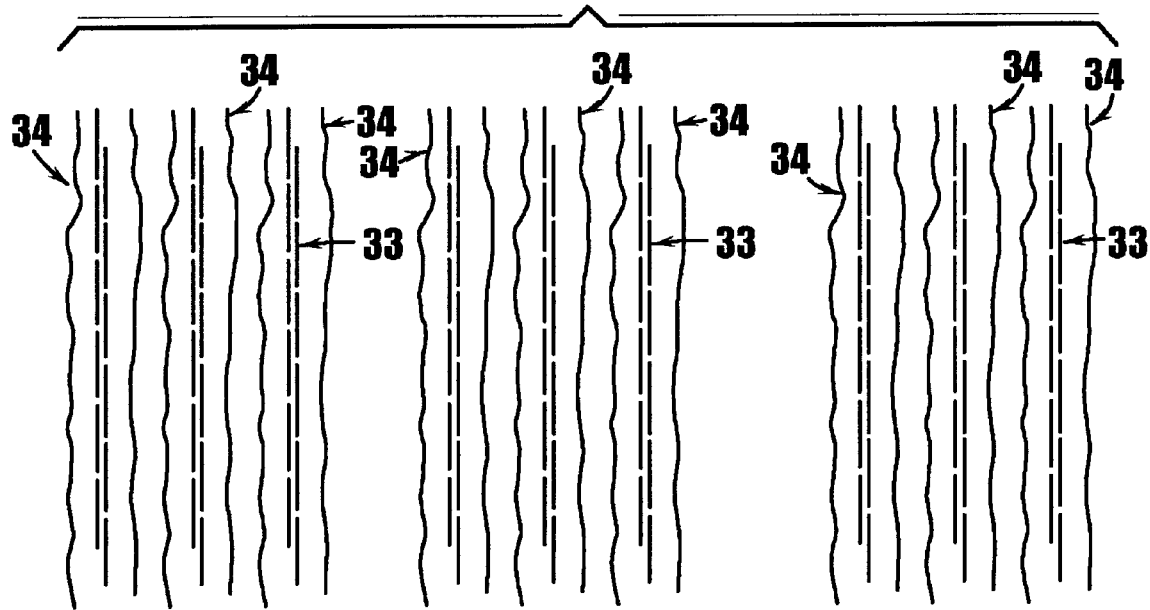
FIG. 4 is a schematic view of a section of the seedbed for the sugarcane field shown in FIG. 3 showing the sugarcane seed pieces planted in an orientation parallel to the direction of the seedbeds.
Figure 5:
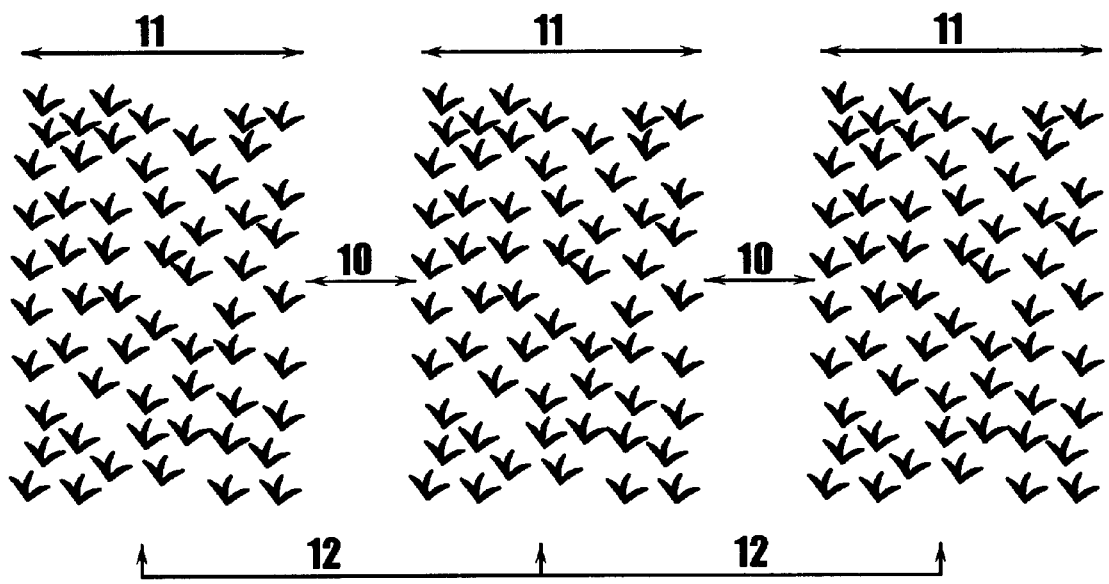
FIG. 5 is a schematic view of a section of a sugarcane field planted using the wide row planting method of the present invention.

Preparation of the soil preferably involves creation of rows of wide furrows. The wide furrows can be created using a variety of implements. As shown in FIG. 5, the width (11) of the planted furrow or seedbed can be between about 0.5 meters and about 3.1 meters (1.6 feet to 10 feet), preferably between about 0.75 meters and about 3.1 meters (about 2.5 feet to 10 feet), and most preferably between about 1 meter and about 2.5 meters (about 3.3 feet to 8.3 feet). Thus, the furrows are wider than the widest furrow (0.45 meters) used for conventional sugarcane planting. Furrow width is determined based primarily upon the size of the equipment to be used to plant, cultivate and harvest the sugarcane crop. The depth of the furrows can be between about 2.5 centimeters and 45 centimeters (1 inch to 18 inches) depending upon the soil conditions.

Between the wide furrows (11), there are lanes (10) which must be sufficiently wide for driving machinery without damaging the sugarcane plants. The lanes (10) are typically about 1.2 meters (approximately 4 feet) wide. Accordingly, the center-to-center distance (12) between the wide furrows (11) can be between about 1.7 meters and about 4.3 meters (about 6 feet to 14 feet), preferably between about 2.7 meters and about 4.3 meters (about 9 feet to 14 feet), and most preferably between about 3 meters and about 4.3 meters (about 10 feet to 14 feet).

Figure 6:
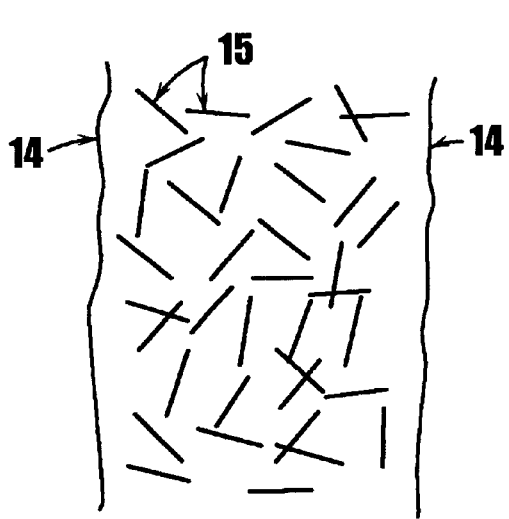
FIG. 6 is a schematic view of a section of a wide row sugarcane seedbed showing sugarcane seed pieces planted with a random orientation.
Figure 7:
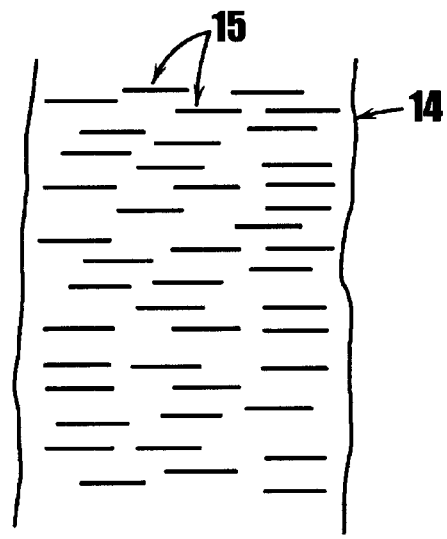
FIG. 7 is a schematic view of a section of a wide row sugarcane seedbed showing sugarcane seed pieces planted perpendicular to the direction of the seedbed.

The sugarcane seed pieces may be placed in the furrows (14) either in a random fashion, with no effort being made to orient the seed pieces (15) in any particular direction as shown in FIG. 6, or they may be oriented in a direction perpendicular to the direction of the furrow (14) as shown in FIG. 7. The seed pieces can be placed in the furrow by hand or using a mechanical planter. Sufficient quantities of seed pieces are placed in each furrow to achieve a grid of sugarcane plants of the desired density. Preferably, the seed pieces should be placed approximately 0.3 to 0.45 meters (12 to 18) inches apart to obtain a grid of plants 0.3 to 0.45 meters (12 to 18 inches) apart.

After placement of the seed pieces in the furrow, the seed pieces are covered with soil. Due to the close spacing of the plants within the planted rows, mechanical cultivation is neither needed nor desirable within the rows. Chemical cultivation methods known to those skilled in the art are used to provide weed control. Weed control in the drive areas between rows can be either chemical or mechanical.

This method of HDP planting is termed "wide row planting." Wide row planting overcomes the problem in traditional non-HDP planting of insufficient plant density to maximize sugarcane yield. Wide row planting is performed using wider seedbeds than used in traditional sugarcane planting methods. In addition, for a given row width, wide row planting results in more plants per unit area than can be achieved using traditional planting methods. As shown by the testing described in Example 1 below, wide row planting results in higher sugarcane yields per unit area than can be achieved by traditional planting methods.

EXAMPLE 1

Sugarcane seed pieces were planted in a suitably prepared 14.5 hectare (35.9 acre) field using two different planting orientations. In the "conventional row" orientation, seed pieces approximately 63 centimeters (24 inches) in length were planted in furrows approximately 45 centimeters (18 inches) wide and approximately 10–15 centimeters (4–6 inches) in depth with seed pieces oriented parallel to the direction to the direction of the furrows. The furrows were on 1.5 meter (5 foot) centers. In the "wide row orientation", seed pieces were placed in wide furrows approximately 1.8 meters (6 feet) wide and approximately 5–10 centimeters (2–4 inches) in depth with seed pieces randomly oriented with respect to the direction of the wide furrow. The wide furrows were mechanically covered with soil sufficient to cause the seed piece depth to be 10 centimeters (4 inches) below the soil surface, resulting in a final distribution of seed pieces approximately 1.1 meter (3.5 feet) in width. The wide furrows were on 3.08 meter (10 foot) centers. The experiment was repeated using two different sugarcane varieties, (CL77-797 and CP84-1198). After growing for 163 days, production was determined in each experiment by counting the number of stalks in 7.6 meter (25 foot) lengths of furrows in ten randomly selected locations within the field, and calculating the number of stalks per hectare. The data are presented in Table 1.

TABLE 1

| Variety | Row Type | Stalks per 7.6 m | Stalks per hectare |
|---|---|---|---|
| CL77-797 | Conventional | 54 | 115,125 |
| CL77-797 | Wide | 120 | 129,112 |
| | % increase in stalks in wide furrows | | 12.1% |
| CP84-1198 | Conventional | 58 | 123,732 |
| CP84-1198 | Wide | 131 | 140,947 |
| | % increase in stalks in wide furrows | | 13.9% |

Wide row planting also overcomes several of the disadvantages of other HDP planting methods. Because wide row planting requires preparation of a only a single wide furrow or seedbed, wide row planting does not require the precision soil preparation of close row HDP planting systems. Accordingly, soil preparation is less expensive and less time consuming than close row HDP systems.

Seed placement in the wide row planting system also offers advantages over the prior art. Because the seed pieces may be placed in a random orientation in the wide row planting system, seed placement can be achieved faster with less labor. By using suitable seed piece rates and suitable quality seed pieces, the wide row planting method of the present invention results in plant spacing within the wide rows of less than 0.5 meters (1.6 feet) between plants. Plant spacing of 0.5 meters or less between plants is optimal for maximizing the yield of sugarcane per unit area.

In another embodiment of the invention, the soil surface may be prepared by creating rows of either flat or raised seedbeds of between about 0.5 to about 3.1 meters (1.6 feet to 10 feet) in width. Raised seedbeds are created by forming mounds of soil at the desired spacing, while flat seedbeds are created by suitably preparing the soil for planting without either a raised seedbed or a furrow. The seedbeds are prepared in a manner suitable for the soil type and local climate. The seed pieces may be randomly placed on flat seedbeds or raised seedbeds or, alternatively the seed pieces may be intentionally oriented in a direction perpendicular to the direction of the seedbeds. The seed pieces are covered with soil and cultivated using chemical cultivation methods.

As will be recognized by those of ordinary skill in the art based on the teachings herein, numerous changes and modifications may be made to the above-described invention without departing from its scope as defined in the appended claims. For example, the seed piece rates used may be increased or decreased, or the depth of the furrows or height of the seedbeds may be varied from that described. Accordingly, this detailed description of preferred embodiments is to be taken in an illustrative, as opposed to a limiting sense.

What is claimed is:

1. A method for planting sugarcane seed, comprising the steps of:

(a) providing sugarcane seed pieces;

(b) preparing the soil to receive the sugarcane seed pieces;

(c) placing the sugarcane seed pieces onto the prepared soil in an orientation perpendicular to the direction of the furrow or seedbed; and (d) covering the sugarcane seed pieces with soil.

2. The method according to claim 1, wherein the step of preparing the soil to receive the sugarcane seed pieces further comprises the step of:

creating rows of wide furrows to receive the sugarcane seed pieces, each of said wide furrows having a width of between 0.5 meters and 3.1 meters.

3. The method according to claim 1, wherein the step of preparing the soil to receive the sugarcane seed pieces further comprises the step of:

creating rows of wide flat seedbeds to receive the sugarcane seed pieces, each of said wide flat seedbeds having a width of between 0.5 meters and 3.1 meters.

4. The method according to claim 1, wherein the step of preparing the soil to receive the sugarcane seed pieces ftirther comprises the step of:

creating rows of wide raised seedbeds to receive the sugarcane seed pieces, each of said wide raised seedbeds having a width of between 0.5 meters and 3.1 meters.

* * * * *